(12) United States Patent
Bhunya et al.

(10) Patent No.: US 12,063,896 B2
(45) Date of Patent: Aug. 20, 2024

(54) BALER IMPLEMENT AND METHOD OF CONTROLLING A ROUND BALER

(71) Applicant: DEERE & COMPANY, Moline, IL (US)

(72) Inventors: Ajit Kumar Bhunya, Hinjilicut (IN); Mohan A. Vadnere, Pune (IN); Mahesh Somarowthu, Pune (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/059,077

(22) Filed: Nov. 28, 2022

(65) Prior Publication Data
US 2024/0172598 A1 May 30, 2024

(51) Int. Cl.
*A01F 15/08* (2006.01)
*A01F 15/07* (2006.01)
*A01F 21/00* (2006.01)

(52) U.S. Cl.
CPC .............. *A01F 21/00* (2013.01); *A01F 15/07* (2013.01); *A01F 15/0883* (2013.01)

(58) Field of Classification Search
CPC .......... A01F 15/07; A01F 15/08; A01F 15/04; A01F 15/0833; A01F 15/0875; A01F 15/0883; A01F 15/148; A01F 21/00
See application file for complete search history.

(56) References Cited

U.S. PATENT DOCUMENTS

| 7,937,923 | B2 * | 5/2011 | Biziorek | A01F 15/0715 56/343 |
| 8,733,242 | B2 * | 5/2014 | Viaud | A01B 59/04 100/88 |
| 2013/0112094 | A1 * | 5/2013 | Smith | A01F 15/08 100/99 |

FOREIGN PATENT DOCUMENTS

| EP | 2052598 A1 | 4/2009 |
| EP | 2301322 A2 | 3/2011 |

OTHER PUBLICATIONS

Extended European Search Report and Written Opinion issued in European Patent Application No. 23210078.4 dated Apr. 4, 2024, in 08 pages.

* cited by examiner

*Primary Examiner* — Jimmy T Nguyen

(57) ABSTRACT

A baler implement includes a bale formation system operable to form crop material into a bale and eject the bale into an unloading zone. An object detection sensor is positioned to detect data related to the unloading zone. A baler controller is operable to determine if an object is present in the unloading zone or if an object is not present in the unloading zone based on a data signal from the object detection sensor. When an object is not present in the unloading zone, the controller may initiate the bale ejection sequence to eject the bale. When an object is present in the unloading zone, the controller may prevent initiation of the bale ejection sequence to prevent ejection of the bale onto the object.

20 Claims, 4 Drawing Sheets

BALER IMPLEMENT AND METHOD OF CONTROLLING A ROUND BALER

TECHNICAL FIELD

The disclosure generally relates to a baler implement and a method of controlling bale ejection from the baler implement.

BACKGROUND

Many different materials may be formed into a bale for transportation and/or storage. The material may include, but is not limited to, forage material such as hay, alfalfa, corn stalks, etc.; cotton; paper; etc. The bales may be formed to include, but are not limited to, a parallelepiped shape or a cylindrical shape. Bales having a parallelepiped shape are generally formed by a square baler implement having a bale formation system that compresses the material into a flake within a rectangular compression chamber, and then bundles multiple flakes together to form the bale having the parallelepiped shape. Bales having a cylindrical shape are generally formed by a baler implement having a bale formation system that continuously feeds the crop material into a cylindrical forming chamber thereby rolling the crop material in a spiral fashion into the bale having the cylindrical shape.

Once a bale is completed in the bale formation system, the bale is ejected from the bale formation system in a rearward direction relative to the baler implement. The bale may be deposited onto the ground surface in an unloading zone. The unloading zone may be considered a zone or area located immediately rearward of the baler implement onto which the bale is ejected from the bale formation system. The unloading zone may be blocked from view of an operator by the baler implement. As such, objects may be present in the unloading zone that may interfere with ejection of the completed bale.

SUMMARY

A baler implement is provided. The baler implement includes a frame and at least one ground engaging element supporting the frame relative to a ground surface. A tongue may be attached to the frame and configured for attachment to a tow vehicle for moving the frame across the ground surface. A bale formation system is operable to form crop material into a bale and eject the bale therefrom rearward into an unloading zone. An object detection sensor is positioned and operable to detect data related to the unloading zone. A baler controller is disposed in communication with the object detection sensor. The baler controller includes a processor and a memory having unloading algorithm stored thereon. The processor is operable to execute the unloading algorithm to receive a bale ejection command to initiate a bale ejection sequence to eject the bale from the bale formation system. The controller further receives a data signal from the object detection sensor related to the unloading zone, and determines if an object is present in the unloading zone or if an object is not present in the unloading zone based on the data signal from the object detection sensor. When the controller determines that an object is not present in the unloading zone, the controller may then initiate the bale ejection sequence to eject the bale from the bale formation system. When the controller determines that an object is present in the unloading zone, then the controller may prevent initiation of the bale ejection sequence to prevent ejection of the bale from the bale formation system.

In one implementation of the disclosure, the baler implement may be configured as, but not limited to, a round baler implement. The round baler implement includes a housing supported by the frame and defining an interior region. The housing includes a forward portion and a rear gate rotatable relative to the forward portion about a gate rotation axis between a closed position and an open position. The bale formation system is disposed within the interior of the housing and is operable to form crop material into a bale having a cylindrical shape. The rear gate is disposed in the closed position during formation of the bale, and is moved into the open position to eject the bale from the bale formation system.

In one aspect of the disclosure, the object detection sensor may include, but is not limited to, one of a camera, a radar sensor, a lidar sensor, a thermal sensor, an infrared sensor, a Terahertz sensor, or a proximity sensor.

The Terahertz sensor may be defined as a sensor operable to emit and detect electromagnetic radiation with a frequency between 0.1 Terahertz and 10 terahertz. Terahertz radiation provides the advantage of at least partial penetration into objects, but is not considered ionizing radiation, like X-rays. As such, Terahertz radiation does not trigger a requirement for a safety officer, nor is it subject to significant regulations, such as those that may apply to X-rays. Terahertz electromagnetic radiation does provide improved detection abilities over optical techniques, such as but not limited to InfraRed (IR) and Ultraviolet (UV) light spectrum optical sensors.

In one aspect of the disclosure, the processor may be operable to execute the unloading algorithm to identify the object detected in the unloading zone. The controller may then generate and communicate a signal to a communicator. The communicator may include, but is not limited to, a touchscreen display of an associated tow vehicle. The signal may include a notification that an object was detected in the unloading zone, and/or the identification of the object detected in the unloading zone.

In one aspect of the disclosure, the processor may be operable to execute the unloading algorithm to classify the identified object detected in the unloading zone as an animal object or as a non-animal object. When the controller classifies the object as an animal object, the controller may then generate and communicate a signal to an alert device. The alert device may include, but is not limited to, light and/or a speaker positioned to direct an audio and/or visual signal toward the unloading zone to prompt the animal object to move out of the unloading zone.

In one aspect of the disclosure, the processor may be operable to execute the unloading algorithm to continuously monitor and/or detect the presence of the object in the unloading zone, and then initiate the bale detection sequence upon the object exiting the unloading zone.

In one aspect of the disclosure, the processor may be operable to execute the unloading algorithm to determine if a bale is currently present in the bale formation system or if no bale is currently present in the bale formation system. When no bale is currently present in the bale formation system but an object is present in the unloading zone, the controller may proceed to execute the bale ejection sequence to open the rear gate.

In one aspect of the disclosure, the processor may be operable to execute the unloading algorithm to determine a profile of the ground surface rearward of the baler implement. The controller may then define a boundary of the unloading zone based on the profile of the ground surface. As such, the boundary of the unloading zone may be defined based on the slope of the ground surface. For example, the boundary of the unloading zone may be defined to include a larger area when the ground profile includes slope greater than a defined limit.

Accordingly, the baler implement described herein monitors the unloading zone rearward the frame to determine the presence of an object in the unloading zone that may interfere with and/or be damaged by ejection of the bale, and prevents the ejection of the bale until the unloading zone is clear, thereby protecting the object and/or the bale from damage.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Referring to the Figures, wherein like numerals indicate like parts throughout the several views, a baler implement is generally shown at 20. The example implementation of the baler implement 20 is configured as a round baler. However, it should be appreciated that the baler implement 20 may differ from the example implementation, and that the teachings of this disclosure may be applied to other implementations of the implement, including but not limited to a large square baler.

Figure 1:
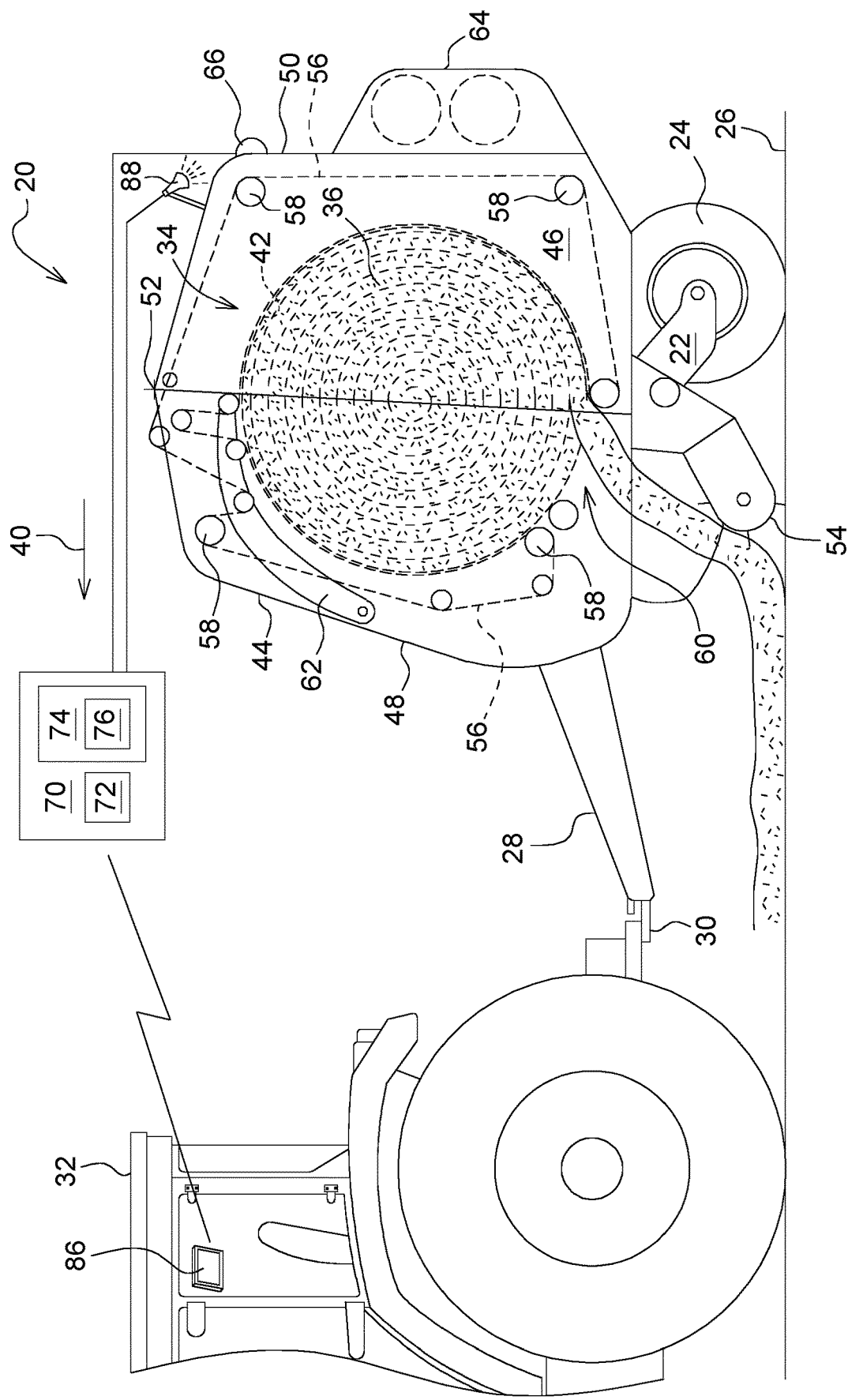
FIG. 1 is a schematic side view of a baler implement and an associated tow vehicle.

Referring to FIG. 1, the baler implement 20 includes a frame 22. One or more ground engaging elements 24, such as but not limited to one or more wheels and/or tracks, are attached to and rotatably supported by the frame 22. The ground engaging elements 24 support the frame 22 relative to a ground surface 26, and enable the baler implement 20 to move across the ground surface 26. A tongue 28 may be coupled to the frame 22 at a forward end of the frame 22. A hitch arrangement 30 may be included with the tongue 28. The hitch arrangement 30 may be used to attach the baler implement 20 to a traction unit or tow vehicle 32, such as but not limited to an agricultural tractor, for moving the baler implement 20 across the ground surface 26. In other embodiments, the baler implement 20 may be self-propelled, in which case the traction unit and the baler implement 20 are configured as a single, self-propelled vehicle.

The baler implement 20 includes a bale formation system 34. The bale formation system 34 is operable to form crop material into a bale 36 and eject the bale 36 therefrom rearward into an unloading zone 38. The unloading zone 38 may be considered a zone or area located immediately rearward of the baler implement 20, relative to a direction of travel 40 of the baler implement 20 during operation, onto which the bale 36 is ejected from the bale formation system 34. The bale formation system 34 may vary with different configurations of the baler implement 20. However, in general, the bale formation system 34 includes a baling chamber 42, sometimes referred to as a compression chamber in some configurations, within which the crop material is compressed into a desired shape forming the bale 36, e.g., a cylindrical shape or a parallelepiped shaped. The example implementation of the bale formation system 34 shown in the Figures and described herein is configured as a round bale formation system 34. However, it should be appreciated that the teachings of this disclosure may be applied to other configurations of the bale formation system 34, such as but not limited to formation systems associated with a large square baler.

As shown in the Figures and described herein, the example implementation of the baler implement 20 includes a housing 44 forming the baling chamber 42. The housing 44 is attached to and supported by the frame 22. The housing 44 may include one or more walls or panels that at least partially enclose and/or define the baling chamber 42.

The housing 44 defines an interior region 46, with the bale formation system 34 disposed within the interior region 46. The housing 44 includes a forward portion 48 and a rear gate 50 rotatable relative to the forward portion 48 about a gate rotation axis 52. The gate is positioned adjacent a rearward end of the frame 22 and is pivotably moveable about the gate rotation axis 52. The gate rotation axis 52 is generally horizontal and perpendicular to a central longitudinal axis of the frame 22. The rear gate 50 is moveable between a closed position for forming a bale 36 within the baling chamber 42, and an open position for discharging the bale 36 from the baling chamber 42.

The baler implement 20 includes a pick-up 54 disposed proximate the forward end of the frame 22. The pick-up 54 gathers crop material from the ground surface 26 and directs the gathered crop material toward and into an inlet 60 of the baling chamber 42. The pick-up 54 may include, but is not limited to tines, forks, augers, conveyors, baffles, etc., for gathering and moving the crop material. The baler implement 20 may be equipped with a pre-cutter, disposed between the pick-up 54 and the inlet 60. As such, the pre-cutter is disposed downstream of the pickup and upstream of the inlet 60 relative to a direction of travel 40 of the crop material. The pre-cutter cuts or chops the crop material into smaller pieces.

The bale formation system 34 may be configured as a variable chamber baler, or as a fixed chamber baler. The baler implement 20 shown in the Figures and described herein is depicted and described as a variable chamber baler. As is understood by those skilled in the art, the variable chamber baler includes a plurality of longitudinally extending side-by-side forming belts 56 that are supported by a plurality of rollers 58. The bale 36 is formed by the forming belts 56 and one or more side walls of the housing 44.

The crop material is directed through the inlet 60 and into the baling chamber 42, whereby the forming belts 56 roll the crop material in a spiral fashion into the bale 36 having a cylindrical shape. The forming belts 56 apply a constant pressure to the crop material as the crop material is formed into the bale 36. A belt tensioner 62 continuously moves the forming belts 56 radially outward relative to a center of the cylindrical bale 36 as the diameter of the bale 36 increases. The belt tensioner 62 maintains the appropriate tension in the belts to obtain the desired density of the crop material.

The baler implement 20 includes a wrap system 64. The wrap system 64 is operable to wrap the bale 36 with a wrap material inside the baling chamber 42. Once the bale 36 is formed to a desired size, the wrap system 64 feeds the wrap material into the baling chamber 42 to wrap the bale 36 and thereby secure the crop material in a tight package and maintain the desired shape of the bale 36. The wrap material may include, but is not limited to, a twine, a net mesh, or a solid plastic wrap. Movement of the gate into the open position simultaneously moves the belts clear of the formed bale 36, and allows the formed and wrapped bale 36 to be discharged through the rear of the baling chamber 42.

The baler implement 20 includes an object detection sensor 66 that is positioned and operable to detect data related to the unloading zone 38. The object detection sensor 66 may be mounted on, for example, on a portion of the housing 44 providing a view of the unloading zone 38 from an elevated position when the rear gate 50 is disposed in the closed position. It should be appreciated that the object detection sensor 66 may be positioned at some other location on the baler implement 20 than shown and described herein.

The object detection sensor 66 may include one or more of, but is not limited to, a camera, a radar sensor, a lidar sensor, a thermal sensor, an infrared sensor, a Terahertz sensor, or a proximity sensor. The object detection sensor 66 senses data related to the unloading zone 38 suitable to enable a baler controller 70 to determine if an object 84 is present in the unloading zone 38, or if an object 84 is not present in the unloading zone 38. For example, in one implementation, the object detection sensor 66 may include a camera or other image capture device that is operable to capture one or more images of the unloading zone 38. In other implementations, the object 84 detection device may include an emitter operable to emit a waveform, e.g., a sound wave or a light wave, in combination with a receiver operable to detect the reflected waveform. It should be appreciated that the object detection sensor 66 may include some other device not specifically described herein that is operable to detect data suitable to enable the baler controller 70 to identify an object 84 in the unloading zone 38.

In one example implementation, the object detection sensor may be embodied as a Terahertz sensor. The Terahertz sensor may be defined as a sensor operable to emit and detect electromagnetic radiation with a frequency between 0.1 Terahertz and 10 terahertz. Terahertz radiation provides the advantage of at least partial penetration into objects, but is not considered ionizing radiation, like X-rays. As such, Terahertz radiation does not trigger a requirement for a safety officer, nor is it subject to significant regulations, such as those that may apply to X-rays. Terahertz electromagnetic radiation does provide improved detection abilities over optical techniques, such as but not limited to InfraRed (IR) and Ultraviolet (UV) light spectrum optical sensors.

The baler controller 70 is disposed in communication with the object detection sensor 66. The baler controller 70 is operable to receive a data signal from the object detection sensor 66, and communicate a control output signal. While the baler controller 70 is generally described herein as a singular device, it should be appreciated that the baler controller 70 may include multiple devices linked together to share and/or communicate information therebetween. Furthermore, it should be appreciated that the baler controller 70 may be located on the baler implement 20 or located remotely from the baler implement 20, such as the associated tow vehicle 32.

The baler controller 70 may alternatively be referred to as a computing device, a computer, a controller, a control unit, a control module, a module, etc. The baler controller 70 includes a processor 72, a memory 74, and all software, hardware, algorithms, connections, sensors, etc., necessary to manage and control the operation of the bale formation system 34 and other systems of the baler implement 20. As such, a method may be embodied as a program or algorithm operable on the baler controller 70. It should be appreciated that the baler controller 70 may include any device capable of analyzing data from various sensors, comparing data, making decisions, and executing the required tasks.

As used herein, "baler controller 70" is intended to be used consistent with how the term is used by a person of skill in the art, and refers to a computing component with processing, memory 74, and communication capabilities, which is utilized to execute instructions (i.e., stored on the memory 74 or received via the communication capabilities) to control or communicate with one or more other components. In certain embodiments, the baler controller 70 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The baler controller 70 may be in communication with other components on the baler implement 20 and/or the tow vehicle 32, such as hydraulic components, electrical components, and operator inputs within an operator station of an associated work vehicle. The baler controller 70 may be electrically connected to these other components by a wiring harness such that messages, commands, and electrical power may be transmitted between the baler controller 70 and the other components. Although the baler controller 70 is referenced in the singular, in alternative embodiments the configuration and functionality described herein can be split across multiple devices using techniques known to a person of ordinary skill in the art.

The baler controller 70 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 74 may include any non-transitory/tangible medium which participates in providing data or computer-readable instructions. The memory 74 may be non-volatile or volatile. Non-volatile media may include, for example, optical or magnetic disks and other persistent memory. Example volatile media may include dynamic random access memory (DRAM), which may constitute a main memory. Other examples of embodiments for memory 74 include a floppy, flexible disk, or hard disk, magnetic tape or other magnetic medium, a CD-ROM, DVD, and/or any other optical medium, as well as other possible memory devices such as flash memory.

The baler controller 70 includes the tangible, non-transitory memory 74 on which are recorded computer-executable instructions, including an unloading algorithm 76. The processor 72 of the baler controller 70 is configured for executing the unloading algorithm 76. The unloading algorithm 76 implements a method of unloading or ejecting a bale 36 from the bale formation system 34, described in detail below.

Figure 6:
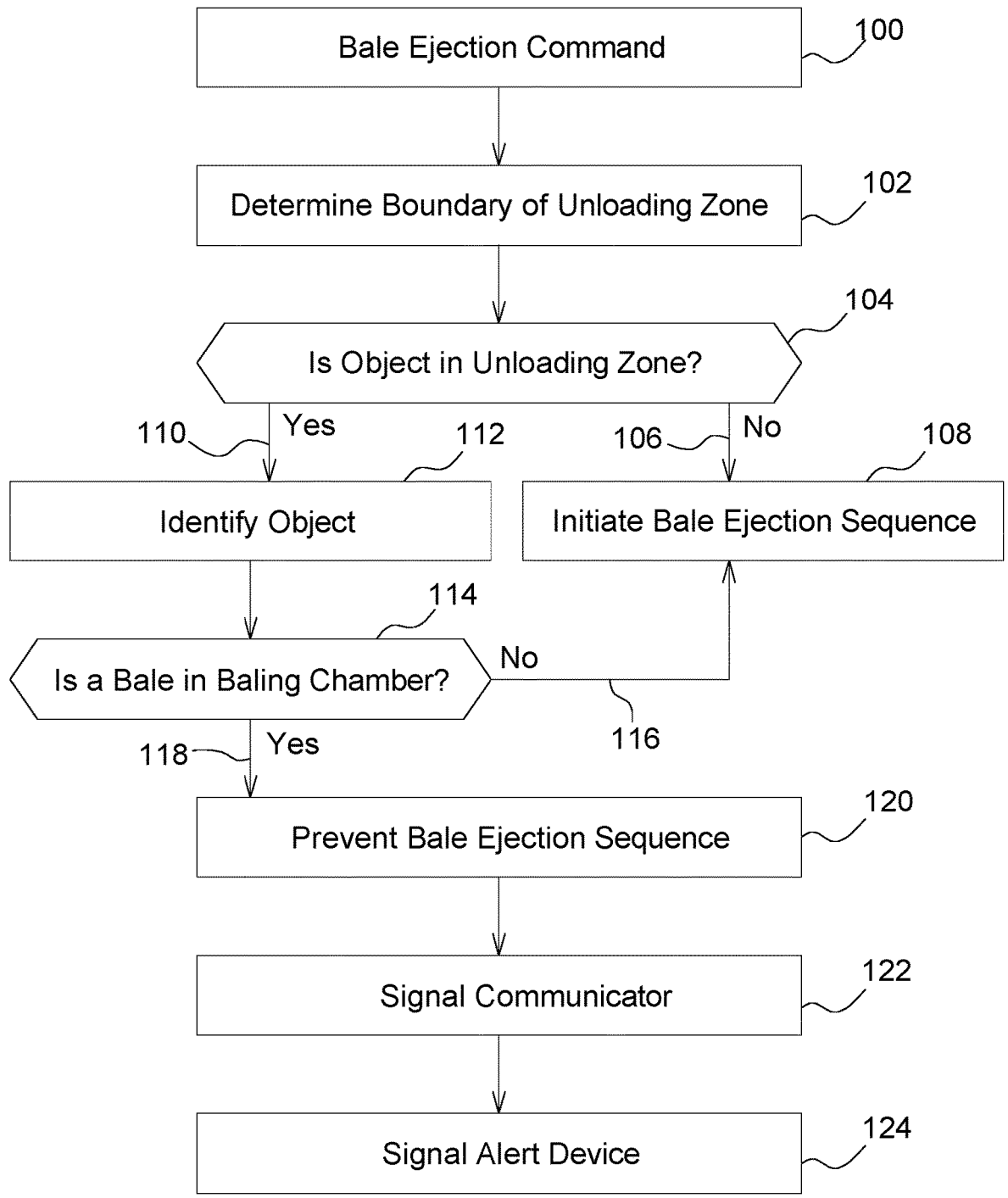
FIG. 6 is a flowchart representing a method of controlling the baler implement.

Referring to FIG. 6, the method of unloading or ejecting the bale 36 from the bale formation system 34 begins with the baler controller 70 receiving a bale ejection command to initiate a bale ejection sequence to eject the bale 36 from the bale formation system 34. The step of receiving the bale ejection command is generally indicated by box 100 shown in FIG. 6. The baler controller 70 may receive the bale ejection command from another control algorithm as part of an automated or autonomous baling process, or may receive the bale ejection command from an operator via a control input device. The control input device may include, but is not limited to, a control button, a touchscreen display, a hydraulic selective control valve, etc. The particular process in which the baler controller 70 receives the bale ejection command and the components used therefore may differ from the example implementations described herein, are known to those skilled in the art, and are therefore not described in greater detail herein.

Figure 2:
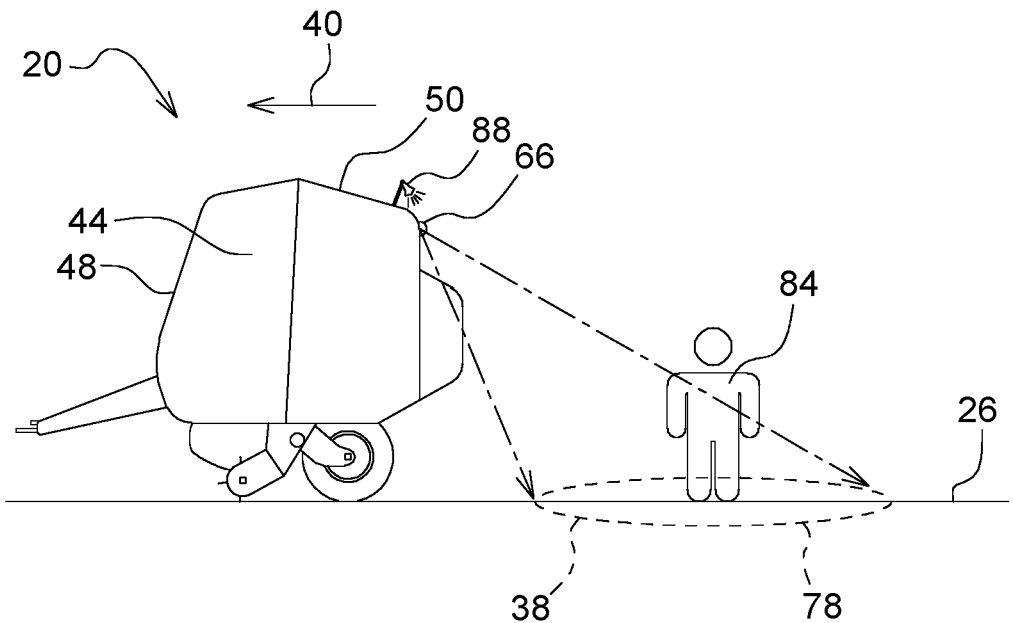
FIG. 2 is a schematic side view of the baler implement and an associated unloading zone showing a non-sloping profile of a ground surface.
Figure 3:
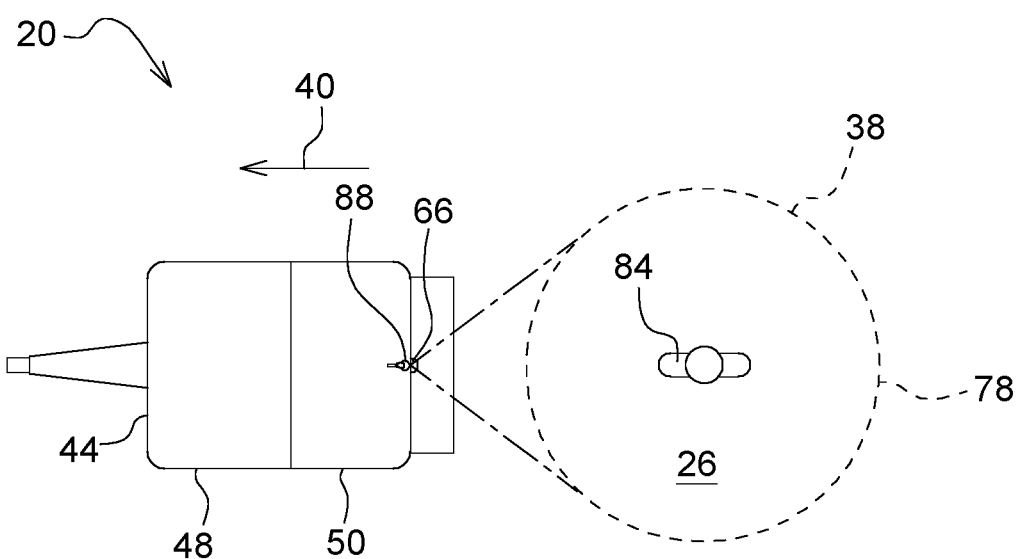
FIG. 3 is a top view of the baler implement and an associated unloading zone shown in FIG. 2.
Figure 4:
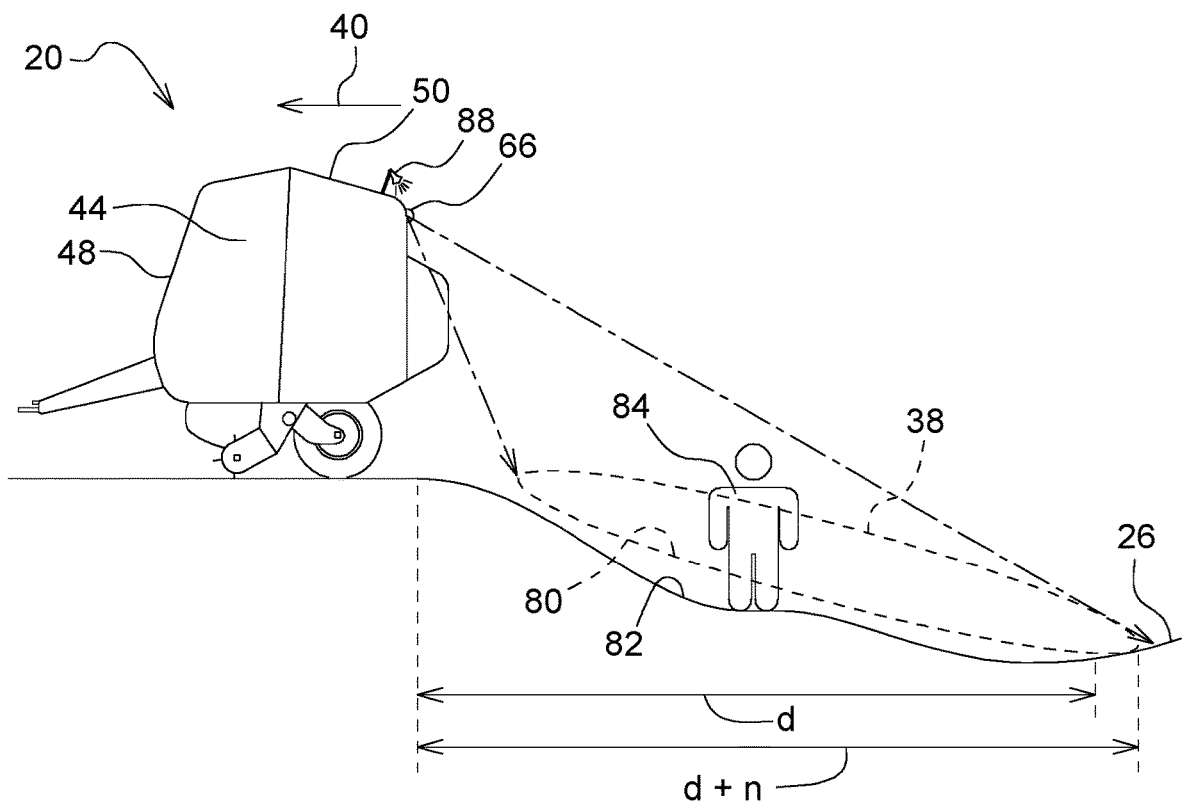
FIG. 4 is a schematic side view of the baler implement and an associated unloading zone showing a sloping profile of the ground surface.
Figure 5:
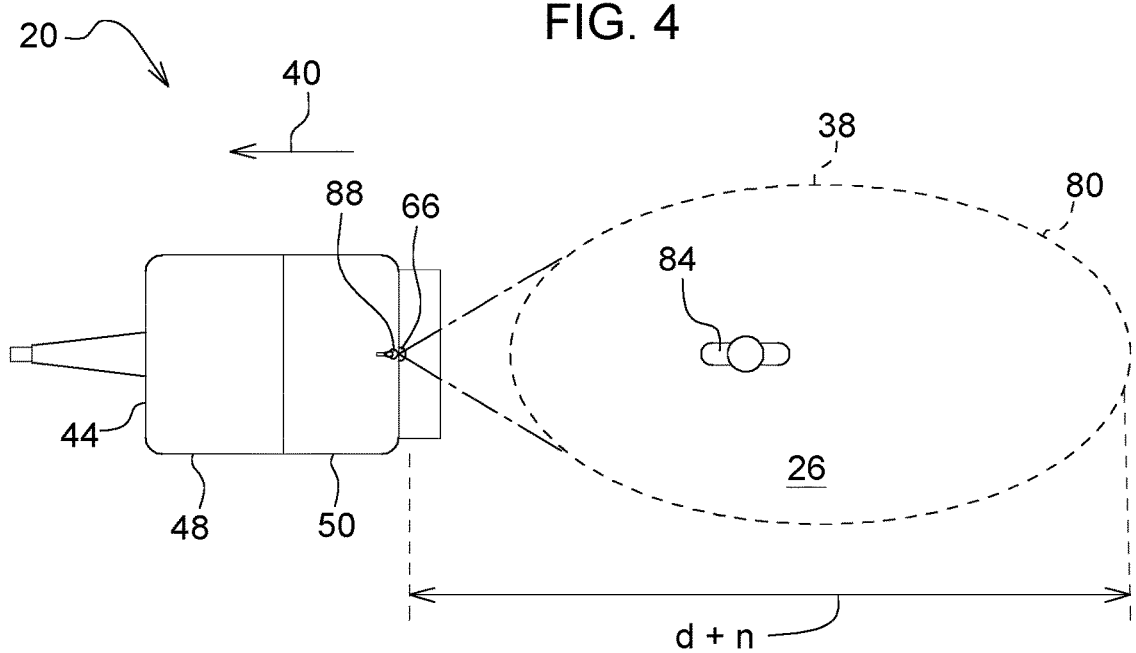
FIG. 5 is a schematic top view of the baler implement and the associated unloading zone of the sloping profile shown in FIG. 4.

The baler controller 70 may then determine the boundary 78, 80 of the unloading zone 38. The step of determining the boundary 78, 80 of the unloading zone 38 is generally indicated by box 102 shown in FIG. 6. In one implementation, referring to FIGS. 2 and 3, the baler controller 70 may use a predefined boundary 78 to define and locate the unloading zone 38. The predefined boundary 78 may be defined to include an area positioned immediately rearward of the baler implement 20 and located relative to the baler implement 20. The predefined boundary 78 may be sized based on an average movement of the able after ejection from the bale formation system 34. In another implementation, referring to FIGS. 4 and 5, the baler controller 70 may define the boundary 80 of the unloading zone 38 based on a profile 82 of the ground surface 26 disposed immediately rearward of the baler implement 20. In order to do so, the baler controller 70 may determine the profile 82 of the ground surface 26. The profile 82 of the ground surface 26 may be determined in a suitable manner. For example, the baler controller 70 may determine a position or location of the baler implement 20 on the ground surface 26 via a position location sensor, e.g., a Global Positioning System sensor, and then use that current position of the baler implement 20 to define the ground profile 82 by referencing a pre-loaded profile 82 map of the ground surface 26 saved on the memory 74 of the baler controller 70. It should be appreciated that the baler controller 70 may determine the ground profile 82 at the current location of the baler implement 20 in some other manner using other data and or sensors, such as but not limited to, an inertial measurement unit, a gyroscope, a lidar sensor, a radar sensor, a stereoscopic camera, surface profile 82 data references from a remote site, for example via a cloud-based server, etc.

Once the baler controller 70 has determined the profile 82, e.g., slope, of the ground surface 26 at the current location of the baler implement 20, the baler controller 70 may then define the boundary 80 of the unloading zone 38. For example, referring to FIGS. 2 and 3, if the baler controller 70 determines that the profile 82 of the ground surface 26 is flat, i.e., less than a pre-defined maximum ground slope, then the baler controller 70 may define the boundary of the unloading zone 38 to equal a standardized limit, e.g., the predefined boundary 78. However, if the baler controller 70 determines that the profile 82 of the ground surface 26 is greater than the pre-defined maximum ground slope, then the baler controller 70 may define the boundary 80 based on the profile 82 of the ground surface 26 at the current location of the baler implement 20. For example, referring to FIGS. 4 and 5, if the profile 82 of the ground slope extends downward in a rearward direction relative to the baler implement 20 for a distance "d", whereafter the profile 82 flattens, then the baler controller 70 may define the boundary 80 of the unloading zone 38 in the rearward direction to be equal to the distance plus a factor (d+n). It should be appreciated that the baler controller 70 may define the boundary 80, including both length and width of the unloading zone 38, in a number of ways to include a number of different sizes based on the profile 82 of the ground surface 26 at the current location of the baler implement 20.

Once the baler controller 70 has received the bale ejection command, the baler controller 70 may then receive a data signal from the object detection sensor 66 related to the unloading zone 38. The baler controller 70 may receive a continuous data feed from the object detection sensor 66, or may query the object detection sensor 66 for the data signal upon receiving the bale ejection command. The data signal may include any information that enables the baler controller 70 to determine and/or identify an object 84 located within the unloading zone 38. For example, the data may include, but is not limited to, one or more photo images, radar data, lidar data, IR data, etc.

Using the data signal from the object detection sensor 66, the baler controller 70 may determine if an object 84 is present in the unloading zone 38 or if an object 84 is not present in the unloading zone 38. The step of determining if an object 84 is present in the unloading zone 38 is generally indicated by box 104 shown in FIG. 6. The manner in which the baler controller 70 determines the presence or absence of an object 84 in the unloading zone 38 is dependent upon the particular configuration of the object detection sensor 66 and/or the data type and content of the data signal. For example, if the object detection sensor 66 is configured as a camera and the data signal includes photographic images, then the baler controller 70 may use object 84 recognition software to determine the presence or absence of an object 84 in the unloading zone 38. Additionally, the object 84 recognition software may include artificial intelligence to identify and/or classify an object 84 disposed in the unloading zone 38. Suitable object 84 recognition and classification algorithms are well known to those skilled in the art, and are therefore not described in greater detail herein.

When the baler controller 70 determines that an object 84 is not present in the unloading zone 38, generally indicated at 106 in FIG. 6, the baler controller 70 may then initiate the bale ejection sequence to eject the bale 36 from the bale formation system 34. The step of initiating the bale ejection sequence is generally indicated by box 108 shown in FIG. 6. The specific steps of the bale ejection sequence are dependent upon the particular configuration of the baler implement 20. In general, for the example implementation of the baler implement 20 described herein, the bale ejection sequence generally includes moving the rear gate 50 from the closed position to the open position, whereby the bale formation system 34 and/or other components of the baler implement 20 discharge or eject the bale 36 from the interior of the housing 44 and onto the ground surface 26 in the unloading zone 38. The specific manner in which the baler implement 20 executes the bale ejection sequence is dependent upon the particular configuration of the baler implement 20, are known to those skilled in the art, are not pertinent to the teachings of this disclosure, and are therefore not described in greater detail herein.

If the baler controller 70 determines that an object 84 is present in the unloading zone 38, generally indicated at 110, the baler controller 70 may optionally be configured to identify the object 84 detected in the unloading zone 38. The step of identifying the object 84 is generally indicated by box 112 shown in FIG. 6. For example, the baler controller 70 may identify and classify the detected object 84 located in the unloading zone 38 as, for example, an animal object 84 or a non-animal object 84. Additionally, the baler controller 70 may identify the type of animal object 84 and/or non-animal object 84. For example, the baler controller 70 may identify the non-animal object 84 as, but not limited to, a bale 36, a rock, a tree, a vehicle, etc. The baler controller 70 may identify the animal object 84 as, but not limited to, a particular type of animal, such as but not limited to, a horse, a cow, a dog, a cat, a goat, a sheep, a human, etc.

In one aspect of the disclosure, the baler controller 70 may determine if a bale 36 is currently present in the bale formation system 34 or if no bale 36 is currently present in the bale formation system 34. The step of determining if a bale 36 is present in the bale formation system 34 is generally indicated by box 114 shown in FIG. 6. If no bale 36 is currently present in the bale formation system 34, generally indicated at 116 in FIG. 6, then there is no danger of a bale 36 being ejected from the bale formation system 34 when the rear gate 50 opens. For example, a user may wish to open the rear gate 50 to inspect and/or service one or more components of the baler implement 20. In so doing, the user may be positioned in the unloading zone 38 yet desire to open the rear gate 50 anyway. If an object 84, e.g., a service technician, is present in the unloading zone 38 and the baler controller 70 determines that no bale 36 is currently present in the bale formation system 34, the baler controller 70 may proceed to initiate the bale ejection sequence to open the rear gate 50, generally indicated by box 108 shown in FIG. 6.

When the baler controller 70 determines that an object 84 is present in the unloading zone 38, generally indicated at 106 in FIG. 6, then the baler controller 70 may prevent initiation of the bale ejection sequence to thereby prevent ejection of the bale 36 from the bale formation system 34. The step of preventing the bale ejection sequence is generally indicated by box 120 shown in FIG. 6. By preventing or blocking the bale ejection sequence when an object 84 is located in the unloading zone 38, the baler controller 70 may prevent the bale 36 from contacting and thereby potentially damaging the object 84 located within the unloading zone 38.

When the baler controller 70 prevents initiation of the bale ejection sequence because an object 84 is determined to be present in the unloading zone 38, the baler controller 70 may then communicate a signal to a communicator 86. The step of signaling the communicator 86 is generally indicated by box 122 shown in FIG. 6. The communicator 86 may include, but is not limited to, a touch screen display located in an operator's station of the tow vehicle 32, a warning light, a siren, a computing device located in a remote location, etc. The signal may include and/or generate a notification on the communicator 86 of the object 84 detected in the loading zone. In one implementation, the signal may include the classification and type of the object 84 if specifically identified. For example, the signal may include a notification that a human is currently located in the unloading zone 38 and that it may not be safe to eject the bale 36 from the bale formation system 34 until the human has exited the unloading zone 38. In other examples, the signal may include a notification that another bale 36 is currently located in the unloading zone 38 and recommend moving the baler implement 20 before discharging the bale 36 from the bale formation system 34.

As noted above, the baler controller 70 may classify the identified object 84 detected in the unloading zone 38 as an animal object 84 or as a non-animal object 84. When the baler controller 70 determines that a bale 36 is currently present in the bale formation system 34, generally indicated at 118 in FIG. 6, and the identified object 84 is classified as an animal object 84, the baler controller 70 may communicate a signal to an alert device 88. The step of communicating the signal to the alert device 88 is generally indicated by box 124 shown in FIG. 6. The alert device 88 may include, but is not limited to, light and/or a speaker positioned to direct a visual and/or audio signal toward the unloading zone 38 to prompt the animal object 84 to move out of the unloading zone 38. For example, if the baler controller 70 determines that the object 84 is an animal object 84, e.g., a human, the baler controller 70 may communicate the signal to the alert device 88 to notify the animal object 84 in the unloading zone 38. The audio/visual signal from the alert device 88 may be sufficient to cause the animal object 84 to exit the unloading zone 38. The baler controller 70 may monitor the presence of the animal object 84 in the unloading zone 38 until the baler controller 70 determines that the animal object 84 has exited the unloading zone 38, at which time the baler controller 70 may proceed to initiate the bale ejection sequence.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A round baler implement comprising:
a frame;
at least one ground engaging element supporting the frame relative to a ground surface;
a tongue attached to the frame and configured for attachment to a tow vehicle for moving the frame across the ground surface;
a housing supported by the frame and defining an interior region, wherein the housing includes a forward portion and a rear gate rotatable relative to the forward portion about a gate rotation axis between a closed position and an open position;
a bale formation system disposed within the interior of the housing and operable to form crop material into a bale having a cylindrical shape;
wherein the rear gate is disposed in the closed position during formation of the bale, and wherein the rear gate is moved into the open position to eject the bale from the bale formation system;
an object detection sensor positioned and operable to detect data related to an unloading zone disposed immediately rearward of the rear gate;
a baler controller in communication with the object detection sensor, the baler controller including a processor and a memory having unloading algorithm stored thereon, wherein the processor is operable to execute the unloading algorithm to:
receive a bale ejection command to initiate a bale ejection sequence to eject the bale from the bale formation system;
receive a data signal from the object detection sensor related to the unloading zone;
determine if an object is present in the unloading zone or if an object is not present in the unloading zone based on the data signal from the object detection sensor;
initiate the bale ejection sequence to eject the bale from the bale formation system when an object is not present in the unloading zone; and
prevent initiation of the bale ejection sequence to prevent ejection of the bale from the bale formation system when an object is present in the unloading zone.

2. The round baler implement set forth in claim 1, wherein the object detection sensor is one of a camera, a radar sensor, a lidar sensor, a thermal sensor, an infrared sensor, a Terahertz sensor, or a proximity sensor.

3. The round baler implement set forth in claim 1, wherein the processor is operable to execute the unloading algorithm to identify the object detected in the unloading zone.

4. The round baler implement set forth in claim 3, wherein the processor is operable to execute the unloading algorithm to communicate a signal to a communicator, wherein the signal includes the identified object detected in the unloading zone.

5. The round baler implement set forth in claim 3, wherein the processor is operable to execute the unloading algorithm to classify the identified object detected in the unloading zone as an animal object or as a non-animal object.

6. The round baler implement set forth in claim 5, wherein the processor is operable to execute the unloading algorithm to communicate a signal to an alert device when the identified object is classified as an animal object.

7. The round baler implement set forth in claim 1, wherein the processor is operable to execute the unloading algorithm to initiate the bale detection sequence upon the object exiting the unloading zone.

8. The round baler implement set forth in claim 1, wherein the processor is operable to execute the unloading algorithm to determine if a bale is currently present in the bale formation system or if no bale is currently present in the bale formation system.

9. The round baler implement set forth in claim 8, wherein the processor is operable to execute the unloading algorithm to initiate the bale ejection sequence when no bale is currently present in the bale formation system and an object is present in the unloading zone.

10. The round baler implement set forth in claim 1, wherein the processor is operable to execute the unloading algorithm to determine a profile of the ground surface.

11. The round baler implement set forth in claim 10, wherein the processor is operable to execute the unloading algorithm to define a boundary of the unloading zone based on the profile of the ground surface.

12. A baler implement comprising:
a frame;
at least one ground engaging element supporting the frame relative to a ground surface;
a tongue attached to the frame and configured for attachment to a tow vehicle for moving the frame across the ground surface;
a bale formation system operable to form crop material into a bale and eject the bale therefrom rearward into an unloading zone;
an object detection sensor positioned and operable to detect data related to the unloading zone;
a baler controller in communication with the object detection sensor, the baler controller including a processor and a memory having unloading algorithm stored thereon, wherein the processor is operable to execute the unloading algorithm to:
receive a bale ejection command to initiate a bale ejection sequence to eject the bale from the bale formation system;
receive a data signal from the object detection sensor related to the unloading zone;
determine if an object is present in the unloading zone or if an object is not present in the unloading zone based on the data signal from the object detection sensor;
initiate the bale ejection sequence to eject the bale from the bale formation system when an object is not present in the unloading zone; and
prevent initiation of the bale ejection sequence to prevent ejection of the bale from the bale formation system when an object is present in the unloading zone.

13. The baler implement set forth in claim 12, wherein the object detection sensor is one of a camera, a radar sensor, a lidar sensor, a thermal sensor, an infrared sensor, a Terahertz sensor, or a proximity sensor.

14. The baler implement set forth in claim 12, wherein the processor is operable to execute the unloading algorithm to identify the object detected in the unloading zone and communicate a signal to a communicator, wherein the signal includes the identified object detected in the unloading zone.

15. The baler implement set forth in claim 12, wherein the processor is operable to execute the unloading algorithm to classify the object detected in the unloading zone as an animal object or as a non-animal object.

16. The baler implement set forth in claim 15, wherein the processor is operable to execute the unloading algorithm to communicate a signal to an alert device when the object is classified as an animal object.

17. The baler implement set forth in claim 12, wherein the processor is operable to execute the unloading algorithm to determine if a bale is currently present in the bale formation system or if no bale is currently present in the bale formation system.

18. The baler implement set forth in claim 17, wherein the processor is operable to execute the unloading algorithm to initiate the bale ejection sequence when no bale is currently present in the bale formation system and an object is present in the unloading zone.

19. The baler implement set forth in claim 12, wherein the processor is operable to execute the unloading algorithm to determine a profile of the ground surface.

20. The baler implement set forth in claim 19, wherein the processor is operable to execute the unloading algorithm to define a boundary of the unloading zone based on the profile of the ground surface.

\* \* \* \* \*